Jan. 25, 1949. E. A. ROCKWELL Re. 23,081
APPARATUS INCLUDING POWER UNIT FOR SETTING BRAKES
Original Filed Sept. 1, 1943
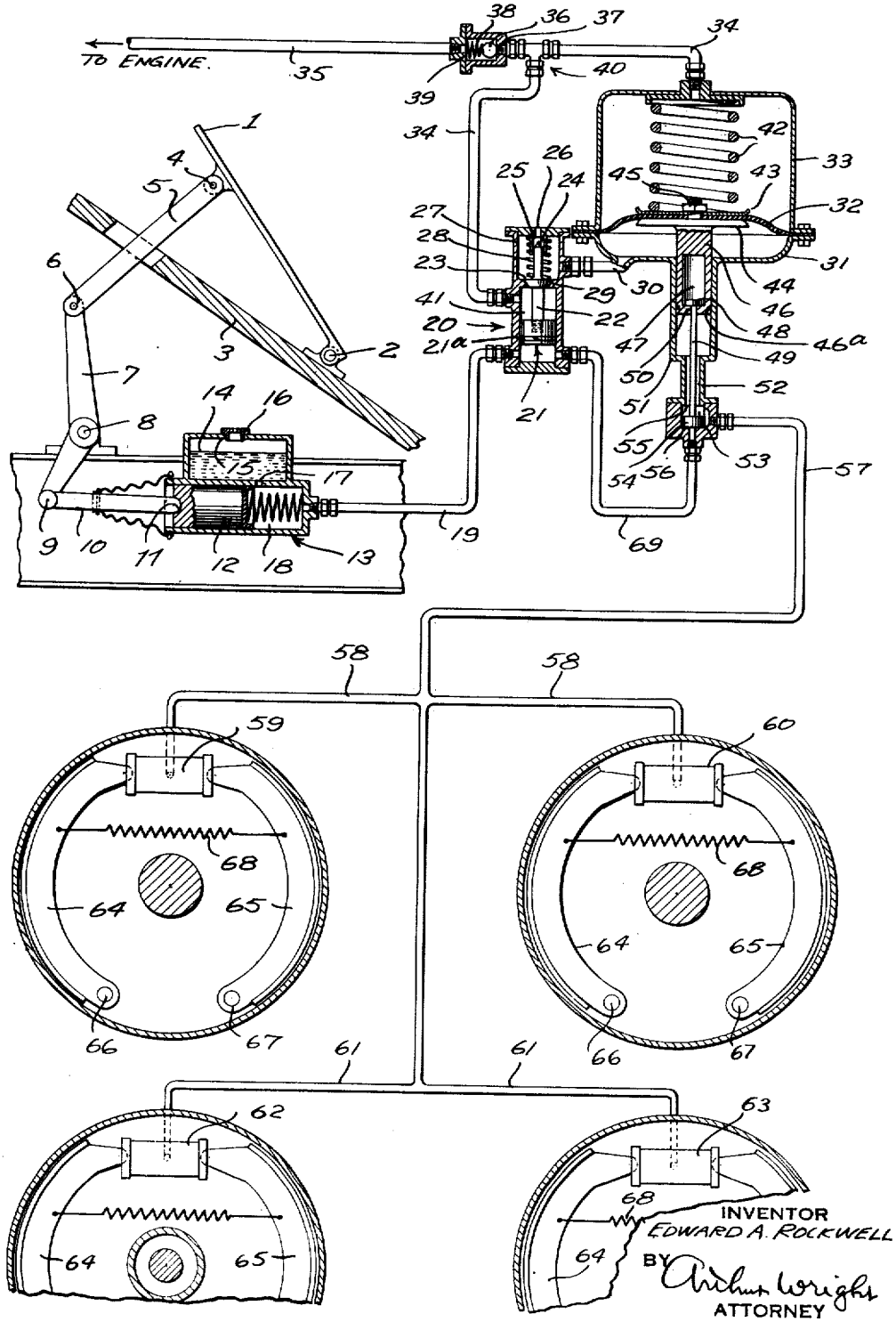

Reissued Jan. 25, 1949

Re. 23,081

UNITED STATES PATENT OFFICE 23,081

APPARATUS INCLUDING POWER UNIT FOR SETTING BRAKES

Edward A. Rockwell, Shaker Heights, Ohio, assignor to Electroflo Corporation, Cleveland, Ohio, a corporation of Delaware Original No. 2,423,204, dated July 1, 1947, Serial No. 501,034, September 1, 1943. Application for reissue June 24, 1948, Serial No. 34,957

31 Claims. (Cl. 188—152)

My invention relates particularly to a brake operating mechanism and which is applicable to the operation of brakes generally, for example in the operation of automotive vehicles, automobiles, etc.

The object of my invention is to provide a brake operating mechanism which is efficient in operation and by means of which a short range of travel of the actuating device, as for instance a pedal or treadle, can be obtained. Another object of my invention is to provide means whereby the brakes may be moved into operative position by a hydraulically controlled source of power and in which the main braking effect may be attained manually. Another object is to move the brakes into operative position by power stored from a spring device, after which the braking effect may be attained manually by a short range of pedal travel. One purpose of this device is to provide a simple cheap power unit that can be applied to passenger cars so as to make available a treadle control instead of a long range pedal, thereby saving considerable room in the front compartment of the automobile. It is the purpose of this device to accomplish this short range pedal operation with a very cheap and simple vacuum power device. In this invention the power device is in the nature of an initial spring-actuated slack adjuster, the vacuum being used to return the spring which has previously set the brakes so that the brakes will be completely released normally in the operation of the vehicle. In shortening the range of the pedal travel the manual work has been reduced, but normal pedal pressures are available. This arrangement enables effective brake operation to be obtained even when the vacuum is not available, as for instance in engine stalling on a steep grade or when the vehicle is being towed.

Another object is to provide a mechanism whereby the shifting from the power application for setting the brakes to the manual operation for applying the brakes is obtained by a double check valve preventing the feed back of the manual pressures to the power means for setting the brakes, the double check valve being controlled by the pressure in the system. A further object is to enable the brakes to be applied in this way by a relatively small master cylinder. In the arrangement in accordance with my invention, the master cylinder is smaller in diameter so that the overall ratio will be the same as in an ordinary passenger car brake system, even though the travel has been reduced, the travel only being reduced, however, by reason of the slack being taken up by the power unit for setting the brakes. The spring, which sets the brakes, is preferably just about sufficient to take up the slack as the brakes wear, and during a condition of towing the vehicle or manipulating on a grade, as mentioned before, the brakes might drag slightly but would be under complete control of the operator without excess pressures. When the vacuum is on, the only function the vacuum has is to assure the release of the brake shoes so that the brake will not drag.

Further objects of my invention will appear from the detailed description of the same hereinafter.

While my invention is capable of embodiment in many different forms, for the purpose of illustration I have shown only one form thereof in the accompanying drawing in which the figure is a diagrammatic representation, partly in section, of an apparatus made in accordance with my invention.

In the drawing, I have shown a treadle 1 carried by a pivot 2 on a floor-board 3 of an automobile. The upper end of the treadle 1 has a pivot 4 connecting it to a link 5 which has a pivotal connection 6 to an angular lever 7 carried by a fixed pivot 8 on the automobile chassis. The lower end of the lever 7 has a pivotal connection 9 to a push rod 10, one end of which is received in a recess 11 in a piston 12 of a relatively small master cylinder 13 of any desired construction, provided with the usual liquid reservoir 14 having a filling opening 15 with a vented cap 16 thereon. A recuperating passage or port 17 connects the reservoir 14 to a chamber 18 in the master cylinder 13, in the retracted position of the piston 12, which is connected by a pipe 19 to a cylinder 20 having a valve operating plunger 21, having a seal 21*a*, therein provided with a stem 22 connecting it to a valve 23 having on the upper face thereof a pin valve 24 adapted to seat on a valve seat 25 in an air vent 26 located on a valve chamber 27. A spring 28 in the chamber 27 normally forces the valve 23 against a valve seat 29 within said chamber 27 so as to normally open the valve 24, 25. A pipe 30 connects the side of the valve chamber 27 with a lower diaphragm casing 31 provided with a flexible diaphragm 32, which is clamped between the lower diaphragm and an upper diaphragm casing 33, connected by a pipe 34 to a vacuum inlet pipe 35, which is connected to the engine manifold of the automobile or any other desired source of vacuum. In the pipe 35 there is a check valve 36 normally pressed against a valve seat 37 by means of a spring 38 located in the pipe 35 and abutting against a shoulder 39 therein. A screw coupling 40 connects the pipe 34 with the pipe 35. The said pipe 34 is connected at its lower end to a chamber 41 adapted to communicate with the valve casing 27 when the valve 23 is in open position. Within the upper diaphragm casing 33 there is a spring 42 which acts as an accumulator and is sufficiently strong to overcome the brake-shoe retracting springs hereinafter referred to. The spring 42 is supported at its upper end against the interior of the upper diaphragm casing 33 and at its lower end by a flared disk 43 supported by the diaphragm 32, on the under-face of which there is a similar flared disk 44. The two disks 43 and 44 are secured by a screw 45 to a hollow plunger 46, provided with a seal 46a, having a cylindrical chamber 47 therein to receive a head 48 of a lost motion valve operating rod 49 which passes through an opening 50 in the lower end of the plunger 46. The rod 49 passes downwardly through a cylinder 51, in which the piston 46 reciprocates, and thence through a passageway 52 to a double check valve chamber 53, where it is connected to a double check valve 54. The valve 54, in its upper position, presses against a valve seat 55 and in its lower position against a valve seat 56. The side of the valve chamber 53 is, furthermore, connected by a pipe 57 to a branch pipe 58 leading to front wheel brake operating cylinders 59 and 60 and by a branch pipe 61 to rear wheel brake operating cylinders 62 and 63. Each of the cylinders 59, 60, 62 and 63 is arranged to operate a pair of brake shoes 64 and 65 in the usual way, carried by pivots 66 and 67, and which have a retracting spring 68 connected between the brake shoes 64 and 65, such as are carried by each of the wheels of the automobile. The lower end of the valve casing 53 is connected by a pipe 69 to the lower end of the cylinder 20.

In the operation of my invention, when the automobile is in operation, a vacuum will be supplied from the engine manifold through the pipe 35, by unseating the check valve 36, so as to supply the vacuum to the upper diaphragm chamber 33, thus storing up power in the accumulator spring 42 due to the air pressure received from the atmosphere through the vent 26 and pipe 30 on the under-face of the diaphragm 32. When it is desired, in the driving of the automobile, to apply the brakes the treadle 1 is moved downwardly so as to move the master cylinder piston 12 to the right, thus applying a very slight amount of pressure to the under-face of the piston 21 sufficient to unseat the valve 23, 29 which is backed by the very light spring 28. This has the immediate result of closing the vent 26 and admitting vacuum from the pipe 34 through the pipe 30 to the lower diaphragm casing 31, thus balancing the pressures on the opposite sides of the diaphragm 32. The stored up power in the accumulator spring 42, thereupon, immediately moves the plunger 46 downwardly, thus applying a hydraulic pressure from the spring 42 through the pipe 57 to the brake cylinders 59, 60, 62 and 63 so as to seat the double check valve 54 on its valve seat 56 and overcome the retracting springs 68 on the four wheels of the automobile and so as to move the brake shoes 64 and 65 thereon into contact with the brake drums in the usual way. Upon the increase of pressure manually from the treadle 1, thereafter, the double check valve 54 is moved upwardly so as to seat against its upper valve seat 55 after being unseated from the valve seat 56 which is insured by the lost motion connection with the valve operating rod 49, so as to prevent the manual pressure from being applied to the power means and thus applying the manual pressure for producing the braking effect through the wheel cylinders 59, 60, 62 and 63. By this means sufficient braking effect is obtained on the wheel brakes by the manual pressure, without the necessity of moving the treadle 1 through more than a very short range of travel. For this reason, also, it will be seen that the master cylinder 13 can be made of comparatively small dimensions. Upon the releasing movement of the treadle 1 the manual pressure is released from the brakes through the pipes 69 and 19, the liquid being returned thereby to the master cylinder 13 and thence for equalization through the port 17 to the reservoir 14. When the manual pressure has been fully released the valve plunger 21 will move downwardly under the influence of the light spring 28 so as to seat the valve 23 on the seat 29 while at the same time opening the air vent through the valve 24, 25. The atmospheric air thus admitted through the pipe 30 will enter the lower diaphragm casing 31 so as to compress the spring 42 and store up energy therein for the subsequent setting of the brakes when the latter are desired to be operated again. In other words, the double check valve 54 becomes again seated against its valve seat 56 whereupon the brakes can be set by the movement of the plunger 46 due to the expansion of the spring 42 and it is only thereafter that the double check valve 54 is moved off its seat 56 to apply the manual pressure to produce the braking effect on the wheel brakes of the automobile. In this way a very compact simple and efficient brake-operating mechanism is attained which is effective under the different operating conditions of the automobile, while at the same time utilizing only a very small master cylinder and operating the same with a very short pedal travel. The short pedal travel is very much desired, as it provides a better control of the brakes and does not require any substantial movement of the treadle to apply the manual force of the brakes during the setting thereof.

While I have described my invention above in detail I wish it to be understood that many changes may be made therein without departing from the spirit of the same.

I claim:

1. In a device of the character described, a source of power, a wheel brake, manually operable means including a master cylinder having a piston provided with a seal, apparatus adapted to apply said power to substantially merely set the brake hydraulically, and means, including a double check valve, connecting the master cylinder with said apparatus so as to thereafter apply a manual hydraulic pressure on said wheel brake and to cut off the application of the power upon the brake while the manual pressure is being applied and allow the return of the liquid through the double check valve to the master cylinder.

2. In a device of the character described, a source of vacuum, a vacuum motor operated thereby, a vacuum valve associated therewith, a wheel brake, manual operating means having a hydraulic connection to operate said valve, apparatus including a spring adapted to apply said vacuum to release spring pressure while the vacuum is being applied to set the brake, and means connecting the manual means with said apparatus so as to thereafter apply merely a manual pressure on said wheel brake after the release of the vacuum.

3. In a device of the character described, a source of vacuum, a vacuum motor including an accumulator spring operated thereby, a wheel brake, manual hydraulically operating means including a master cylinder having a piston provided with a seal, apparatus, including a pressure-applying plunger and cylinder and a liquid cut-off valve, adapted to apply the pressure of said spring to the brake to set the brake, and means connecting the master cylinder with said apparatus so as to thereafter apply a manual pressure, while cutting off the liquid from the spring pressure by the cut-off valve, on said wheel brake.

4. In a device of the character described, a source of vacuum, a vacuum motor including an accumulator spring operated thereby, a wheel brake, manual hydraulically operating means including a master cylinder having a piston provided with a seal, apparatus, including a pressure-applying plunger and cylinder and a liquid cut-off valve, adapted to apply the pressure of said spring to the brake to set the brake, and means connecting the master cylinder with said apparatus so as to thereafter apply a manual pressure, while cutting off the liquid from the spring pressure by the cut-off valve, on said wheel brake, said wheel brake having a retracting spring adapted to be overcome by the accumulator spring.

5. In a device of the character described, a source of vacuum, a vacuum motor operated thereby, a wheel brake, manual hydraulically operating means, a spring compressed by said vacuum, apparatus, including a pressure-applying plunger and a liquid cut-off valve, adapted to apply said vacuum to set the brake by the force of said spring, and means connecting the manual means with said apparatus so as to thereafter apply a manual pressure, while cutting off the liquid from the spring pressure by the cut-off valve, on said wheel brake, said vacuum motor comprising a pressure-responsive diaphragm and said manual means having a valve responsive to manual pressures for controlling the application of the vacuum to said diaphragm.

6. In a device of the character described, a source of vacuum, a vacuum motor including an accumulator spring operated thereby, a wheel brake, manual hydraulically operating means, a spring compressed by said vacuum, apparatus, including a pressure-applying plunger and cylinder and a liquid cut-off valve, adapted to apply said vacuum to set the brake by the force of said spring, and means connecting the manual means with said apparatus so as to thereafter apply a manual pressure, while cutting off the liquid from the spring pressure by the cut-off valve, from the manual means on said wheel brake, said vacuum motor comprising a pressure-responsive diaphragm and said manual means having a valve responsive to manual pressure for controlling the application of the vacuum to said diaphragm.

7. In a device of the character described, a source of vacuum, a vacuum motor including an accumulator spring operated thereby, a wheel brake, manual hydraulically operating means, apparatus, including a pressure-applying plunger and cylinder and a liquid cut-off valve, adapted to apply said vacuum to set the brake by the force of said spring, and means connecting the manual means with said apparatus so as to thereafter apply a manual pressure, while cutting off the liquid from the spring pressure by the cut-off valve, from the manual means on said wheel brake, said wheel brake having a retracting spring adapted to be overcome by the accumulator spring, said vacuum motor comprising a pressure-responsive diaphragm and said manual means having a valve responsive to manual pressures for controlling the application of the vacuum to said diaphragm.

8. In a device of the character described, a source of vacuum, a vacuum motor operated thereby, a wheel brake, manual hydraulically operating means, a spring compressed by said vacuum apparatus adapted to apply said vacuum to set the brake by the force of said spring, and means connecting the manual means with said apparatus so as to thereafter apply a manual pressure on said wheel brake, said vacuum motor comprising a pressure-responsive diaphragm and said manual means having a valve responsive to manual pressures for controlling the application of the vacuum to said diaphragm and the said diaphragm having a plunger and a cylinder with a liquid cut-off valve connecting it to the wheel brake and cutting off the spring pressure to the brake when the manual pressure is applied to the brake.

9. In a device of the character described, a source of vacuum, a vacuum motor including an accumulator spring operated thereby, a wheel brake, manual hydraulically operating means, apparatus adapted to apply said vacuum to set the brake by the force of said spring, and means connecting the manual means with said apparatus so as to thereafter apply a manual pressure on said wheel brake, said vacuum motor comprising a pressure-responsive diaphragm and said manual means having a valve responsive to manual pressure for controlling the application of the vacuum to said diaphragm and the said diaphragm having a plunger and a cylinder with a liquid cut-off valve connecting it to the wheel brake and cutting off the spring pressure to the brake when the manual pressure is applied to the brake.

10. In a device of the character described, a source of vacuum, a vacuum motor including an accumulator spring operated thereby, a wheel brake, manual hydraulically operating means, apparatus adapted to apply said vacuum to set the brake by the force of said spring, and means connecting the manual means with said apparatus so as to thereafter apply a manual pressure on said wheel brake, said wheel brake having a retracting spring adapted to be overcome by the accumulator spring, said vacuum motor comprising a pressure-responsive diaphragm and said manual means having a valve responsive to manual pressures for controlling the application of the vacuum to said diaphragm and the said diaphragm having a plunger with a liquid cut-off valve connecting it to the wheel brake and cutting off the spring pressure to the brake when the manual pressure is applied to the brake.

11. In a device of the character described, a source of vacuum, a vacuum motor operated thereby, a wheel brake, manual hydraulically operating means including a spring compressed by said vacuum, apparatus adapted to apply said vacuum to set the brake by the force of said spring, and means connecting the manual means with said apparatus so as to thereafter apply a manual pressure on said wheel brake, said manual apparatus having a valve responsive to manual pressures for controlling the application of the vacuum to said diaphragm and the said diaphragm having a plunger connecting it to the wheel brake, provided with a double check valve adapted to alternately connect merely the said spring pressure or the manual pressure with the wheel brake.

12. In a device of the character described, a source of vacuum, a vacuum motor including an accumulator spring operated thereby, a wheel brake, manual hydraulically operating means, apparatus adapted to apply said vacuum to set the brake by the force of said spring, and means connecting the manual means with said apparatus so as to thereafter apply a manual pressure on said wheel brake, said vacuum motor comprising a pressure-responsive diaphragm and said manual apparatus having a valve responsive to manual pressure for controlling the application of the vacuum to said diaphragm and the said diaphragm having a plunger connecting it to the wheel brake, provided with a double check valve adapted to alternately connect merely the said spring pressure or the manual pressure with the wheel brake.

13. In a device of the character described, a source of vacuum, a vacuum motor including an accumulator spring operated thereby, a wheel brake, manual hydraulically operating apparatus adapted to apply said vacuum to set the brake by the force of said spring, and means connecting the manual means with said apparatus so as to thereafter apply a manual pressure on said wheel brake, said wheel brake having a retracting spring adapted to be overcome by the accumulator spring, said vacuum motor comprising a pressure-responsive diaphragm and said manual apparatus having a valve responsive to manual pressures for controlling the application of the vacuum to said diaphragm and the said diaphragm having a plunger connecting it to the wheel brake, provided with a double check valve adapted to alternately connect merely the said spring pressure or the manual pressure with the wheel brake.

14. In a device of the character described, a source of vacuum power, a vacuum valve for controlling the application of said power, a wheel brake, manually operable means including a master cylinder, a spring operable by the vacuum, apparatus connected to said valve and adapted, when the vacuum valve is moved to open position by hydraulic pressure from the master cylinder, to apply said power to set the brake by pressure from said spring, and means connecting the manual means with said apparatus so as to thereafter apply merely a manual pressure on said wheel brake.

15. In a device of the character described, a source of vacuum power, a vacuum valve for controlling the application of said power, a wheel brake, manually operable means including a master cylinder, a spring operable by the vacuum, apparatus connected to said valve and adapted, when the vacuum valve is moved to open position by hydraulic pressure from the master cylinder, to apply said power to set the brake by pressure from said spring, and means connecting the manual means with said apparatus so as to thereafter apply merely a manual pressure on said wheel brake, said master cylinder being of reduced capacity due to the setting of the brake merely by the power from the power source.

16. In a device of the character described, a source of vacuum power, a vacuum valve for controlling the application of said power, a wheel brake, a spring operable by the vacuum, manually operable means including a pedal having a short range of travel and a master cylinder, apparatus connected to said valve and adapted, when the vacuum valve is moved to open position by hydraulic pressure from the master cylinder, to apply said power to set the brake by pressure from said spring, and means connecting the manual means with said apparatus so as to thereafter apply merely a manual pressure on said wheel brake.

17. In a device of the character described, a source of vacuum power, a vacuum valve for controlling the application of said power, a wheel brake, a spring operable by the vacuum, manually operable means including a pedal having a short range of travel and a master cylinder, apparatus connected to said valve and adapted, when the vacuum valve is moved to open position by hydraulic pressure from the master cylinder, to apply said power to set the brake by pressure from said spring, and means connecting the manual means with said apparatus so as to thereafter apply merely a manual pressure on said wheel brake, said master cylinder being of reduced capacity due to the setting of the brake merely by the power from the power source.

18. In a device of the character described, a source of vacuum, a vacuum valve associated therewith, a wheel brake, manual operating means having a hydraulic connection to operate said valve, apparatus, including a spring and a movable wall associated with said spring, adapted to apply said vacuum to release spring pressure while the vacuum is being applied to both sides of said wall to set the brake, and means connecting the manual means with said apparatus so as to thereafter apply a manual pressure on said wheel brake.

19. In a device of the character described, a source of vacuum, a check valve to trap the vacuum received by the device therefrom, a vacuum valve associated therewith, a wheel brake, manual operating means having a hydraulic connection to operate said valve, apparatus, including a spring, adapted to apply said vacuum to release spring pressure while the vacuum trapped by said check valve is being applied to set the brake, and means connecting the manual means with said apparatus so as to thereafter apply a manual pressure on said wheel brake and subsequently release the pressure on the wheel brake by the trapped vacuum.

20. In a device of the character described, a source of power, a wheel brake, manually operable means including a master cylinder having a piston provided with a seal, apparatus adapted to apply said power to substantially merely set the brakes hydraulically, and means, including a double check valve, connecting the master cylinder with said apparatus so as to thereafter apply a manual hydraulic pressure on said wheel brake and to cut off the application of the power upon the brake while the manual pressure is being applied and allow the return of the liquid through the double check valve to the master cylinder, the check valve having a lost motion connection to the said apparatus so as to be moved thereby to open the check valve at one end of the lost motion connection.

21. In a device of the character described, a source of vacuum, a vacuum valve associated therewith, a wheel brake, manual operating means having a connection to operate said valve, apparatus, including a spring and a movable wall associated with said spring, adapted to apply said vacuum to release spring pressure while the vacuum is being applied to both sides of said wall to set the brake, and means connecting the manual means with said apparatus so as to thereafter apply a manual pressure on said wheel brake.

22. In a device of the character described, a source of vacuum, a check valve to trap the vacuum received by the device therefrom, a vacuum valve associated therewith, a wheel brake, manual operating means having a connection to operate said valve, apparatus including a spring, adapted to apply said vacuum to release spring pressure while the vacuum trapped by said check valve is being applied to set the brake, and means connecting the manual means with said apparatus so as to thereafter apply a manual pressure on said wheel brake and subsequently release the pressure on the wheel brake by the trapped vacuum.

23. In a device of the character described, manual means for operating the same, a wheel brake having a hydraulic motor and means to retract the same, a hydraulic plunger and cylinder having a force applying element acting thereon, constituting means to apply a limited hydraulic pressure on the motor to substantially merely counterbalance the retracting means to set the brake, a piston and a cylinder having, operatively connected therewith, a recuperating passage in communication with a liquid reservoir, apparatus adapted to control the application of hydraulic pressure to said brake motor from the pressure in said cylinders and acting on said plunger and piston including operative means hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

24. In a device of the character described, manual means for operating the same, a hydraulic plunger and cylinder having a spring acting thereon, constituting means to apply a limited hydraulic pressure, a wheel brake having a hydraulic motor and means to retract the same, a piston and a cylinder having, operatively connected therewith, a recuperating passage in communication with a liquid reservoir including means controlled by the movement of the piston to open the said passage in the initial position thereof, apparatus adapted to control the application of hydraulic pressure to said brake motor from the pressure in said cylinders and acting on said plunger and piston including operative means hydraulically responsive to the manual means whereby liquid is returned to said reservoir from the brake motor by the retracting means in the normal position of the elements of said device and whereby said hydraulically responsive means operatively controls the sequence of the application of the limited pressure and the pressure developed by the manual means respectively to said brake motor for the control and operation of said brake.

25. In a device of the character described, manual means for operating the same, a wheel brake having a hydraulic motor and means to retract the same, a hydraulic plunger and cylinder having a power operated device acting thereon, constituting means to apply a limited hydraulic pressure on the motor to substantially merely counter-balance the retracting means to set the brake, a piston and a cylinder having, operatively connected therewith, a recuperating passage in communication with a liquid reservoir, apparatus adapted to control the application of hydraulic pressure to said brake motor from the pressure in said cylinders and acting on said plunger and piston including operative means hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

26. In a device of the character described, manual means for operating the same, a wheel brake having a hydraulic motor and means to retract the same, a hydraulic plunger and cylinder having a force applying element acting thereon, constituting means to apply a limited hydraulic pressure on the motor to substantially merely counter-balance the retracting means to set the brake, a piston and a cylinder having, operatively connected therewith, a recuperating passage in communication with a liquid reservoir, apparatus adapted to control the application of hydraulic pressure to said brake motor from the pressure in said cylinders and acting on said plunger and piston including operative means having a valve device cooperating therewith hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

27. In a device of the character described, manual means for operating the same, a wheel brake having a hydraulic motor and means to retract the same, a hydraulic plunger and cylinder having a force applying element acting thereon, constituting means to apply a limited hydraulic pressure on the motor to substantially merely counter-balance the retracting means to set the brake, a piston and a cylinder having, operatively connected therewith, a recuperating passage in communication with a liquid reservoir, apparatus adapted to control the application of hydraulic pressure to said brake motor from the pressure in said cylinders and acting on said plunger and piston including operative means having a lost motion and valve device cooperating therewith hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

28. In a device of the character described, manual means for operating the same, including a treadle with a short range of travel, a wheel brake having a hydraulic motor and means to retract the same, a hydraulic plunger and cylinder having a power operated device acting thereon, constituting means to apply a limited hydraulic pressure on the motor, to substantially merely counterbalance the retracting means to set the brakes, a piston and a cylinder having, operatively connected therewith, a recuperating passage in communication with a liquid reservoir, apparatus adapted to control the application of hydraulic pressure to said brake motor from the pressure in said cylinders and acting on said plunger and piston including operative means hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

29. In a device of the character described, manual means for operating the same, a wheel brake having a power operated hydraulic motor and means to retract the same, a hydraulic plunger and cylinder having a power operated device acting thereon, constituting means to apply a limited hydraulic pressure on the motor, to substantially merely counterbalance the retracting means to set the brakes, a piston and a cylinder of reduced capacity having, operatively connected therewith, a recuperating passage in communication with a liquid reservoir, apparatus adapted to control the application of hydraulic pressure to said brake motor from the pressure in said cylinders and acting on said plunger and piston including operative means hydraulically responsive to the manual means comprising two liquid check valve faces and seats therefor adapted to be opened in a direction for flow of the fluid towards the brake motor and to provide a communication from said hydraulic plunger cylinder and said piston cylinder respectively to said reservoir by means of said passage from the brake motor by the retracting means in the normal position of the elements of said device and whereby said hydraulically responsive means operatively controls the sequence of the application of the limited hydraulic pressure developed by the plunger and the hydraulic pressure developed by the piston respectively to said brake motor for the control and operation of said brake.

30. In a device of the character described, a source of vacuum, a vacuum valve associated therewith, a wheel brake, manual operating means having a connection to operate said valve, apparatus, including a spring and a movable wall associated with said spring, adapted to apply said vacuum to release spring pressure while the vacuum is being applied to both sides of said wall, said apparatus constituting means to substantially merely set the brake, and means connecting the manual means with said apparatus so as to thereafter have effective a manual pressure on said wheel brake.

31. In a device of the character described, a source of vacuum, a check valve to trap the vacuum received by the device therefrom, a vacuum valve associated therewith, a wheel brake, manual operating means having a connection to operate said valve, apparatus including a spring, adapted to apply said vacuum to release spring pressure while the vacuum trapped by said check valve is being applied, said apparatus constituting means to substantially merely set the brake, and means connecting the manual means with said apparatus so as to thereafter have effective a manual pressure on said wheel brake and subsequently release the pressure on the wheel brake by the trapped vacuum.

EDWARD A. ROCKWELL.

REFERENCES CITED

The following references are of record in the file of this patent:

UNITED STATES PATENTS

| Number | Name | Date |
|---|---|---|
| 1,899,009 | Bradbury | Feb. 28, 1933 |
| 2,078,209 | Sanford et al. | Apr. 20, 1937 |
| 2,106,757 | Oliver | Feb. 1, 1938 |
| 2,106,758 | Oliver | Feb. 1, 1938 |
| 2,112,609 | Schnell | Mar. 29, 1938 |
| 2,260,492 | Stelzer | Oct. 28, 1941 |

Certificate of Correction

Reissue No. 23,081. January 25, 1949.

EDWARD A. ROCKWELL

It is hereby certified that errors appear in the printed specification of the above numbered patent requiring correction as follows:

Column 11, line 36, claim 28, and column 12, line 1, claim 29, for the word "brakes" read *brake*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*